United States Patent [19]

Walker et al.

[11] Patent Number: 4,873,211

[45] Date of Patent: Oct. 10, 1989

[54] CRACKING CATALYST AND PROCESS

[75] Inventors: Darrell W. Walker, Media, Pa.; A. M. Schaffer, Bartlesville, Okla.

[73] Assignee: Phillips Petroleum Company, Bartlesville, Okla.

[21] Appl. No.: 193,863

[22] Filed: May 13, 1988

Related U.S. Application Data

[62] Division of Ser. No. 69,337, Jul. 2, 1987, Pat. No. 4,765,884.

[51] Int. Cl.$^4$ .................. B01J 27/18; B01J 27/82; B01J 29/06
[52] U.S. Cl. .................................. 502/64; 502/214
[58] Field of Search ............... 502/64, 69, 208, 214, 502/87

[56] References Cited

U.S. PATENT DOCUMENTS

| | | | |
|---|---|---|---|
| 3,044,954 | 7/1962 | Kirschler | 208/114 |
| 3,271,299 | 9/1966 | Kearby | 208/114 |
| 3,342,750 | 9/1967 | Kearby | 208/114 |
| 3,354,096 | 11/1967 | Young | 252/435 |
| 3,904,550 | 9/1975 | Pine | 252/437 |
| 4,080,311 | 3/1978 | Kehl | 252/437 |
| 4,158,621 | 6/1979 | Swift et al. | 208/114 |
| 4,179,358 | 12/1979 | Swift et al. | 208/114 |
| 4,222,896 | 9/1980 | Swift et al. | 252/437 |
| 4,310,440 | 1/1982 | Wilson et al. | 252/435 |
| 4,318,799 | 3/1982 | Yoo | 208/114 |
| 4,377,470 | 3/1983 | Kettinger, Jr. et al. | 208/120 |
| 4,385,994 | 5/1983 | Wilson et al. | 210/689 |
| 4,424,116 | 1/1984 | Kettinger, Jr. | 208/120 |
| 4,430,199 | 2/1984 | Durante et al. | 208/114 |
| 4,444,965 | 4/1984 | McDaniel et al. | 526/105 |
| 4,512,875 | 4/1985 | Long et al. | 208/114 |
| 4,512,876 | 4/1985 | Miale et al. | 208/120 |
| 4,584,091 | 4/1986 | Pine | 208/120 |
| 4,605,637 | 8/1986 | Chang et al. | 502/64 |
| 4,629,717 | 12/1986 | Chao | 502/208 |
| 4,664,779 | 5/1987 | Bertus et al. | 208/114 |
| 4,692,237 | 9/1987 | Sato et al. | 208/120 |
| 4,724,066 | 2/1988 | Kirker et al. | 208/114 |

OTHER PUBLICATIONS

Kearby, K., "New AlPO$_4$ Gels as Acid Catalysts," Proceedings of the 2nd International Congress of Catalysis, 1960, Paris.

Marcelin, G. et al., "Alumina–Aluminum Phosphate as a Large Pore Support and its Application to Liquid Phase Hydrogenation," *Journal of Catalysis* 83, pp. 42–49 (1983).

*Primary Examiner*—H. M. S. Sneed
*Assistant Examiner*—George R. Fourson
*Attorney, Agent, or Firm*—K. K. Brandes

[57] ABSTRACT

A composition of matter, effective as cracking catalyst, comprises zeolite and a matrix material comprising aluminum phosphate, being substantially free of alumina and magnesia. A process for cracking hydrocarbon-containing feed streams having an initial boiling point of at least about 400° F. (at atmospheric pressure) employs the above cracking catalyst.

11 Claims, No Drawings

CRACKING CATALYST AND PROCESS

This application is a division of application Ser. No. 69,337, filed July 2, 1987, now U.S. Pat. No. 4,765,884.

BACKGROUND OF THE INVENTION

In one aspect, this invention relates to an effective cracking catalyst composition. In another aspect, this invention relates to a catalytic cracking process.

Cracking catalysts comprising zeolite embedded in a matrix of inorganic refractory materials are known. Also the use of these cracking catalysts for cracking of hydrocarbon oils, such as gas oil, is known. Frequently, these cracking catalysts lose some activity after having been exposed to high temperature steam during the regeneration cycle. Also, many of these known cracking catalysts exhibit conversion and selectivity problems when heavier feedstocks, such as hydrotreated residua (which also contain metal impurities), are employed. This invention is directed to the preparation of a novel, improved cracking catalyst composition, which exhibits good steam stability and is well suited for use in processes for cracking heavy oils.

SUMMARY OF THE INVENTION

It is an object of this invention to provide a novel, effective cracking catalyst composition exhibiting high steam stability. It is another object to provide a process for cracking hydrocarbon-containing feedstocks, employing the above cracking catalyst composition. It is a further object of this invention, to provide a cracking process wherein the above cracking catalyst composition is exposed to steam during the catalyst regeneration cycle. It is a still further object of this invention to provide an improved process for cracking heavy hydrocarbon-containing feedstocks. Other objectives and advantages will become apparent from the detailed description and the appended claims.

In accordance with this invention, there is provided a composition of matter (effective as a cracking catalyst composition comprising:

(a) zeolite and (b) a matrix material, in which said zeolite is embedded, comprising (preferably consisting essentially of) aluminum phosphate, with alumina and magnesia being substantially absent from the matrix material.

Also in accordance with this invention, a catalytic cracking process comprises the step of:

(A) contacting a hydrocarbon containing feed stream, having an initial boiling point of at least 400° F. at atmospheric conditions (0 psig=1 atm) with a cracking catalyst composition comprising (preferably consisting essentially of):

(a) zeolite and (b) a matrix material, in which said zeolite is embedded, comprising (preferably consisting essentially of) aluminum phosphate, with alumina and magnesia being substantially absent from the matrix material, under such cracking conditions as to obtain at least one liquid product stream (i.e., one or two or more than two product streams) having a lower initial boiling point and a higher API gravity than said feed stream.

Preferably, the cracking process comprises the additional steps of (B) separating the cracking catalyst, which has been used in step (A), from gases and said at least one liquid product stream, (C) exposing the separated catalyst from step (C) to flowing steam (for removal of adhered liquids from the catalyst), (D) heating the steam-stripped cracking catalyst from step (C) in a free oxygen containing gas (so as to burn coke deposits, and, optionally, (E) recycling at least a portion of the regenerated catalyst from step (D) to the cracking reactor, i.e., the cracking zone of step (A).

DETAILED DESCRIPTION OF THE INVENTION

Cracking Catalyst Composition

The zeolite component of the composition of matter (cracking catalyst composition) of this invention can be any natural or synthetic crystalline aluminosilicate zeolite which exhibits cracking activity. Non-limiting examples of such zeolite are faujasite, chabazite, mordenite, offretite, erionite, Zeolon, zeolite X, zeolite Y, zeolite L, zeolite ZSM, and the like, and mixtures thereof. Additional examples of suitable zeolites are listed in U.S. Pat. No. 4,158,621, herein incorporated by reference. It is within the scope of this invention to use zeolites from which a portion of Al has been removed from the crystalline framework, and/or which have been ion-exchanged with rare earth metal or ammonium or by other conventional ion-exchange methods. Preferably, a synthetic faujasite of the Y-type (zeolite Y), more preferably a rare earth-exchanged zeolite Y (REY zeolite), is employed as catalyst component (a). The BET/$N_2$ surface area of the zeolite preferably ranges from about 200 to about 1,000 $m^2/g$.

The matrix material (b) comprises (preferably consists essentially of) aluminum phosphate ($AlPO_4$). The Al:P ratio in the aluminum phosphate ratio is approximately stoichiometric, and preferably is in the range of from about 0.9:1 to about 1:1.

The aluminum phosphate matrix material is substantially free of alumina and magnesia, i.e., essentially no alumina and magnesia or only trace amounts thereof (preferably less than about 0.5 weight-% of $Al_2O_3$ and less than about 0.5 weight-% of MgO) should be present in the aluminum phosphate matrix material. The BET/$N_2$ surface area (determined essentially in accordance with ASTM D3037) of the matrix material generally exceeds about 50 $m^2/g$. Preferably, the surface area of aluminum phosphate is in the range of from about 50 to about 300 $m^2/g$.

The aluminum phosphate material can be prepared by any suitable method, generally by precipitation from an aqueous solution upon mixing of a solution containing ionic species of Al preferably $Al^{3+}$ and a second solution containing $H_3PO_4$ or $HPO_4^{3-}$ or $PO_4^{3-}$ ions at a suitable pH, followed by suitable liquid-solid separation, washing and substantial dehydration of the precipitate. At present, the most preferred precipitation method comprises mixing an aqueous solution of $(NH_4)_2HPO_4$ with an aqueous solution of $Al(NO_3)_3$ (generally as hydrate), adjusting the pH of the mixture of the two solutions to about 6–8 by adding a base (preferably aqueous ammonia), filtering the mixture so as to recover hydrated aluminum phosphate gel, washing the hydrated aluminum phosphate gel with water and substantially drying it (preferably at about 100°–150° C.

The zeolite component (a) can be embedded in the aluminum phosphate matrix material (b) in any suitable manner. Preferably, a slurry of the zeolite in liquid (more preferably in water) and a slurry of the aluminum phosphate matrix material in a liquid (more preferably water) are mixed; the dispersed zeolite/Al phosphate mixture is separated by an suitable method (more preferably by filtration) from the liquid portion of the slurry mixture; the separated intimate zeolite/Al phosphate mixture is at least partially dried (more preferably at about 100°–200° C.) and then calcined (more preferably by heating in air, at about 600°–900° C. for about 1–5 hours). The zeolite/Al phosphate material can be ground and sieved during any phase of the preparation (preferably after drying) so as to obtain a material having a desired particle size range (preferably 10/40 mesh). The material can also be exposed to steam, e.g., at about 700°–1500° F. The calcined intimate mixture of zeolite and aluminum phosphate (i.e., zeolite embedded in an aluminum phosphate matrix) generally has a BET/$N_2$ surface area in the range of from about 50 to about 800 $m^2/g$, preferably from about 100 to about 400 $m^2$/g. Generally, the weight ratio of zeolite to the matrix material is in the range of from about 1:30 to about 1:1, preferably from about 1:15 to about 1:3.

Cracking Process

The hydrocarbon-containing feed stream for the process of this invention can be any feedstock having an initial boiling point (ASTM D 1160) in excess of about 400° F., preferably boiling in the range of from about 400° to about 1300° F., more preferably boiling in the range of from about 600° to about 1200° F., all measured under atmospheric pressure conditions (about 0 psig=1 atm). A particularly preferred feed stream is a heavy oil, about 90 volume-% of which boils above 650° F. (at atmospheric pressure). The API$^{60}$ gravity (measured at 60° F.) of the feed generally is in the range of from about 5 to about 40, preferably from about 10 to about 30. Frequently these feedstocks also contain Ramsbottom carbon residue (ASTM D524; generally about 0.1–20 weight-%), sulfur (generally about 0.1–5 weight-%), nitrogen (generally about 0.05–2 weight-%), nickel (generally about 0.5–50 ppmw), and vanadium (generally about 1–100 ppmw).

Non-limiting examples of suitable feedstocks are light and heavy oils (including vacuum gas oil), cracker recycle oils (cycle oils), cracker slurry and decant oils, topped crudes (residua), distillation bottom fractions, hydrotreated residua (e.g., hydrotreated in the presence of Ni, Co, Mo-promoted alumina catalysts), liquid coal pyrolyzates, liquid products from extraction of coal, liquid products from liquefaction of coal, liquid products from tar sand, shale oils, fractions of shale oils, and the like. Presently most preferred feedstocks are hydrotreated residua.

Any suitable reactor can be used for the catalyst cracking process of this invention. Generally a fluidized-bed catalytic cracking (FCC) reactor (preferably containing one or two or more risers) or a moving bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116, herein incorporated by reference. The cracking catalyst used in the cracking process of this invention has been described above in the section entitled "Cracking Catalyst Composition". The cracking catalyst that has been used in the cracking process (commonly called spent catalyst) contains deposits of coke and metals or compounds of metals (in particular nickel and vanadium compounds). The spent catalyst is generally seperated from formed gases and liquid products by any conventional separation means (e.g., in a cyclone), as is described in the above-cited patents and also in "Petroleum Refining" by James H. Gary and Glenn E. Handwerk, Marcel Dekker, Inc., 1975, herein incorporated by reference. Adhered liquid oil is generally stripped from the spent catalyst by flowing steam (preferably having a temperature of about 700°–1,500° F.). The steam-stripped catalyst is generally heated in a free oxygen-containing gas stream in the regeneration unit of the cracking reactor, as is shown in the above-cited references. Generally, air is used as the free oxygen containing gas; and the temperature of the catalyst during regeneration with air preferably is about 1100°–1400° F. (i.e., about 590°–760° C.). Substantially all coke deposits are burned off and metal deposits are at least partially converted to metal oxides. Enough fresh, unused cracking catalyst is generally added to the regenerated cracking catalyst, so as to provide a so-called equilibrium catalyst of desireably high cracking activity. At least a portion of the regenerated (with or without added fresh catalyst) is generally recycled to the cracking reactor. Preferably the recycled portion of the regenerated catalyst is transported by means of a suitable lift gas stream (e.g., steam and/or hydrogen and/or gaseous hydrocarbons) to the cracking reactor and introduced to the cracking zone (with or without the lift gas).

Specific operating conditions of the cracking operation depend greatly on the type of feed, the type and dimensions of the cracking reactor and the oil feed rate. Examples of operating conditions are described in the above-cited references and in many other publications. In an FCC operation, generally the weight ratio of catalyst to oil feed (i.e., hydrocarbon-containing feed) ranges from about 2:1 to about 10:1, the contact time between oil feed and catalyst is in the range of about 0.2 to about 3 seconds, and the cracking temperature is in the range of from about 800° to about 1200° F. Generally steam is added with the oil feed to the FCC reactor so as to aid in the dispersion of the oil as droplets. Generally the weight ratio of steam to oil feed is in the range of from about 0.01:1 to about 0.5:1. Hydrogen gas can also be added to the cracking reactor; but presently $H_2$ addition is not a preferred feature of this invention.

The separation of liquid products into various gaseous and liquid product fractions can be carried out by any conventional separation means, generally by fractional distillation. The most desirable product fraction is gasoline (ASTM boiling range: about 180°–400° F.). Non-limiting examples of such separation schemes are shown in "Petroleum Refining" by James H. Gary and Glenn E. Handwerk, cited above.

The following examples are presented to further illustrate the invenion and are not to be considered unduly limiting the scope of the invention.

EXAMPLE I

This example illustrates the preparation of various zeolite containing cracking catalysts.

Invention Catalyst A contained about 10 weight-% zeolite embedded in an aluminum phosphate matrix and was prepared as follows. 400 cc of a first aqueous solution containing 108 grams of dissolved $(NH_4)_2HPO_4$ was added to 1200 cc of a second aqueous solution containing 307 grams of dissolved Al(NO$_3$)$_3$.9H$_2$. The mixture was stirred until it was almost clear. Then the pH of this mixture (pH: 1.7) was raised to about 7.0 by adding aqueous ammonia. The precipitated aluminum phosphate gel was recovered by filtration, slurried in 2 liters of distilled water with stirring, and filtered again. A portion of the wet aluminum phosphate gel was dried in a circulating air oven at 125° C. and submitted for analysis. The dried aluminum phosphate contained 24.5 weight-% P and 20.5 weight Al. Thus, the atomic ratio of Al:P was 0.96:1.

The remainder of the wet gel (about 820 grams) was slurried with 300 cc of distilled water and mixed with a slurry of 10 grams REY zeolite in 50 cc water. The REY zeolite was a calcined rare earth-exchanged Y zeolite, provided by Union Carbide Corporation, Danbury, Connecticut, containing 14.1 weight-% rare earth metals and 2.5 weight-% Na, and having a BET/N$_2$ surface area of 546 M$^2$/g. The mixture of the two slurries was stirred for about 30 minutes and then dried overnight in a circulating air oven at 125° C. The dried zeolite/Al phosphate material was ground and sieved. A 40/100 mesh sample was dried again at 125° C. and then calcined in air for 3 hours at 1500° F. (about 815° C.). Calcined Catalyst A had a BET/N$_2$ surface of 194 m$^2$g. After steam-treatment for 7 hours at 760° C. in a stream of 100% steam, the surface area had decreased to 154 m$^2$/g.

A second sample of Catalyst A, labeled Catalyst A' contained about 20 weight-% REY zeolite embedded in aluminum phosphate as matrix and had a surface area of 221 m$^2$/g before steam-treatment (181 m$^2$/g after steam-treatment).

Control Catalyst B contained about 10 weight-% REY zeolite embedded in a magnesia/alumina/aluminum phosphate matrix. The matrix material was prepared substantially in accordance with the procedure described in Example I of U.S. Pat. No. 4,179,358. The washed and dried magnesia/alumina/aluminum phosphate matrix material contained about 6 weight-% MgO, about 55 weight-% Al$_2$O$_3$ and about 39 weight-% AlPO$_4$, and had a BET/N$_2$ surface area of 144 m$^2$/g. 2.2 grams of REY zeolite (described above) was slurried with 150 cc distilled water and mixed with wet, coprecipitated magnesia/alumina/aluminum phosphate gel. This mixture was dried at 125° C., ground and sieved. A 40/100 mesh sample was dried again and calcined in air for 5 hours at 500° C.

Control Catalyst C contained about 20 weight-% REY zeolite embedded in an alumina matrix. This catalyst was prepared substantially in accordance with the procedure for Catalyst A, except that a Boehmite alumina (Catapal, marketed by Conoco, Ponca City, OK) was used in lieu of alumina phosphate and that 20 weight-% zeolite was slurried with alumina gel. Calcined Catalyst C had a BET/N$_2$ surface area of 202 m$^2$/g before steam-treatment (137 m$^2$/g after steam-treatment).

Control Catalyst D contained about 20 weight-% REY zeolite embedded in a silica-alumina matrix. The silica-alumina matrix material was prepared by mixing a solution containing 1185 grams sodium silicate in 5 liters of water with 300 cc of an aqueous solution containing 110 grams of concentrated H$_2$SO$_4$, so as to precipitate a silica hydrogel at a pH of about 10 and a temperature of about 105°–110° F. The silica hydrogel was allowed to age for about 30 minutes. Then 1.5 liters of an aqueous solution containing 693 grams of Al$_2$(SO$_4$)$_3$.14–18 H$_2$O was added with vigorous stirring to the aged silica hydrogel slurry. The thus obtained silica-alumina hydrogel was aged for 10 minutes. 300 cc of ammonium hydroxide solution was added to the hydrogel slurry, and thereafter 115 REY zeolite was added with stirring. The slurry was dried and calcined as described for Catalyst A. The surface of calcined Catalyst D was about 324 m$^2$/g before steam-treatment (134 m$^2$/g after steam-treatment).

Control Catalyst E was a commercial zeolite based cracking catalyst, GX-30 (provided by the Davison Chemical Division of W. R. Grace and Company, Baltimore, Md.: surface area: 195 m$^2$/g; pore volume: 0.34 cc/g; containing about 0.6 weight-% Na, about 33 weight-% alumina and silica as the remainder).

Surface areas of three of the above-described catalysts before and after steam-treatment are listed in Table I.

TABLE I

| Catalyst | Surface Area Before Steaming | Surface Area After Steaming | % Loss of Surf. Area |
|---|---|---|---|
| A' (20% REY/Al Phosphate) | 221 | 181 | 18 |
| C (20% REY/Alumina) | 202 | 137 | 32 |
| D (20% REY/SiO$_2$—Al$_2$O$_3$) | 324 | 134 | 59 |

Data in Table I indicate that Catalyst A' containing the aluminum phosphate matrix material lost less surface area by steam-treatment (at 760° C./7 hours/100% steam) and thus exhibited higher hydrothermal resistance than the other two catalysts which contained alumina and silica-alumina, respectively, as matrix materials.

EXAMPLE II

This example illustrates the use of two aluminum phosphate containing zeolite catalysts for catalytic cracking. Catalysts A and B were evaluated using a microactivity cracking test procedure in accordance with ASTM D3907-80. Cracking conditions were: 900° F., 3:1 catalyst:oil weight ratio, 5.0 grams of catalyst used; 1.25 minute feed injection, followed by a 10 minute nitrogen purge. The feed oil was a gas oil having a boiling range of 700° to 900° F. at atmospheric pressure. Tests were carried with unsteamed and steam-treated catalysts (see Example I). Test results are summarized in Table II.

TABLE II

| Catalyst | Steam Treated | MAT-Conversion (wt - %) | Gasoline (wt - %) | Light Cycle Oil (wt - %) | Heavy Cycle Oil (wt - %) | Gases (wt - %) | Coke (wt - %) |
|---|---|---|---|---|---|---|---|
| A | No | 66.6 | 48.8 | 16.4 | 17.1 | 12.4 | 6.1 |
| A | No | 67.9 | 47.9 | 15.9 | 16.1 | 11.3 | 6.6 |
| B | No | 66.5 | 47.9 | 17.2 | 16.3 | 12.3 | 3.1 |
| B | No | 66.0 | 42.3 | 15.9 | 18.2 | 16.1 | 3.9 |
| A | Yes | 59.1 | 45.5 | 18.9 | 22.0 | 13.8 | 4.3 |

TABLE II-continued

| Catalyst | Steam Treated | MAT-Conversion (wt - %) | Gasoline (wt - %) | Light Cycle Oil (wt - %) | Heavy Cycle Oil (wt - %) | Gases (wt - %) | Coke (wt - %) |
| --- | --- | --- | --- | --- | --- | --- | --- |
| A | Yes | 57.9 | 45.1 | 19.4 | 22.7 | 6.1 | 4.2 |
| A | Yes | 61.3 | 47.3 | 18.0 | 20.7 | 9.2 | 4.4 |
| B | Yes | 42.1 | 35.8 | 19.4 | 38.5 | 4.2 | 3.1 |
| B | Yes | 39.1 | 32.6 | 18.8 | 42.2 | 3.1 | 3.0 |

Test data in Table II show that Catalyst A of this invention comprising zeolite and a matrix consisting essentially of aluminum phosphate and Control Catalyst B comprising zeolite and a matrix which contained other components (MgO, $Al_2O_3$) besides aluminum phosphate performed approximately equally well (in terms of conversion and gasoline yield) when both catalysts were not steam-treated. However, when the catalysts were steam-treated (at 760° C., for 7 hours), Invention Catalyst A was far superior to Control Catalyst B, as indicated by higher conversion, higher gasoline yield and lower heavy cycle oil yield. Since in a commercial cracking operations the catalysts are subjected to steam at high temperature during the regeneration cycle, it is concluded that a zeolite catalyst, wherein the matrix material consists essentially of aluminum phosphate, will be superior to other zeolite catalysts the matrix material of which contain other components, such as magnesium oxide, alumina and silica.

EXAMPLE III

This example illustrates the effect of the cracker feed on the cracking performance of several zeolite-based catalysts. Table III summarizes MAT (ASTM D3907-80) cracking data for four cracking catalysts described in Example I and two different feed oils.

Feed oil G was a gas oil ( provided by Phillips Petroleum Company, Bartlesville, Okla.; designated "Kansas City Gas Oil"), which had an $API^{60}$ gravity of about 30, a sulfur content at about 0.2 weight-%, a nickel content of 0.25 ppmw (parts by weight per million parts by weight of oil), a vanadium content of 9 ppmw and a boiling range for 90% if its volume of 550°–1010° F. (measured in accordance with ASTM D1160). Feed oil H was a hydrotreated residuum (effluent from a commercial catalytic hydrodesulfurization reactor of a Phillips Petroleum Company refinery), which had an $API^{60}$ gravity of 22.7, a sulfur content of about 0.3 weight-%, a nickel content of 6.9 ppmw and a vanadium content of 13.0 ppmw.

TABLE III

| Feed | Catalyst[1] | MAT Convers. (wt - %) | Gasoline (wt - %) | Gases (wt - %) | Coke (wt - %) |
| --- | --- | --- | --- | --- | --- |
| G | A' | 74.3 | 46.8 | 12.3 | 5.8 |
| G | C | 57.9 | 46.1 | 11.3 | 4.4 |
| G | D | 74.8 | 47.1 | 14.3 | 5.8 |
| G | E | 76.2 | 48.9 | 14.6 | 6.2 |
| H | A' | 83.6 | 50.1 | 8.0 | 14.7 |
| H | C | 78.6 | 42.4 | 15.7 | 16.3 |
| H | D | 82.1 | 45.8 | 18.5 | 14.3 |
| H | E | 78.7 | 44.5 | 14.2 | 16.6 |

Test data in Table III show that Invention Catalyst A' was considerably more active than Control Catalyst C (with $Al_2O_3$ as matrix) in both test series, probably chiefly because of the greater hydrothermal stability of A' vs. C (see Table I of Example). The cracking performance of Invention Catalyst A' was comparable to that of Control Catalysts D and E (with silica-alumina matrix) when gas oil G was used as the cracker feed oil.

However, when the hydrotreated residuum H, which had a considerably higher average molecular weight and higher density than G, was used as the feed oil, Invention Catalyst A' was superior, in terms of conversion and gasoline yield, to Catalyst D and commercial Catalyst E (both with silica-alumina as matrix).

Based on these test results, it is concluded that the catalyst of this invention containing a zeolite (in particular of Y zeolite) and a matrix material initially consisting essentially of aluminum phosphate is particularly suited for cracking heavy feedstocks (preferably hydrotreated resids) which have higher average molecular weight and lower API gravity than gas oils. It is predicted that in the future these heavier feedstocks will comprise a greater portion of FCC cracker feedstocks in oil refineries.

Reasonable variation, modifications and adaptations for various usages and conditions can be made within the scope of the disclosure and the appended claims, without departing from the scope of this invention.

That what is claimed is:

1. A composition of matter, effective as a cracking catalyst composition, comprising:
   (a) zeolite and
   (b) a matrix material, in which said zeolite is embedded, consisting essentially of aluminum phosphate.

2. A composition of matter in accordance with claim 1 wherein said zeolite (a) is a zeolite Y having a $BET/N_2$ surface area in the range of from about 200 to about 1,000 m²/g.

3. A composition of matter in accordance with claim 1 wherein the $BET/N_2$ surface area of said matrix material (b) exceeds about 50 m²/g.

4. A composition of matter in accordance with claim 1 wherein the $BET/N_2$ surface area of said matrix material (b) is in the range of from about 50 to about 300 m²/g.

5. A composition of matter in accordance with claim 1 wherein the atomic ratio of Al to P of said aluminum phosphate is in the range of from about 0.9:1 to about 1:1.

6. A composition of matter in accordance with claim 1 wherein the weight ratio of said zeolite (a) to said matrix material (b) is in the range of from about 1:30 to about 1:1.

7. A composition of matter in accordance with claim 1 having a $BET/N_2$ surface area in the range of from about 50 to about 800 m² /g.

8. A composition of matter in accordance with claim 1 having been prepared by a process comprising the steps of (i) mixing a slurry of a zeolite in a liquid with a slurry of aluminum phosphate in a liquid; (ii) separating the obtained mixture of dispersed zeolite and aluminum phosphate from the liquid portion of the mixture of the two slurries obtained in step (i); (iii) at least partially drying the separated mixture of zeolite and aluminum phosphate obtained in step (ii), and (iv) calcining the at least partially dried mixture obtained in step (iii).

9. A composition of matter in accordance with claim 8 wherein drying step (iii) is carried out at about 100°–200° C. and calcining step (iv) is carried out at about 600°–900° C.

10. A composition of matter in accordance with claim 1 having been steam-treated.

11. A composition of matter in accordance with claim 1 having been steam-treated at about 700°–1500° F.

* * * * *